United States Patent [19]

Brouwer

[11] Patent Number: 4,878,578
[45] Date of Patent: Nov. 7, 1989

[54] SPLIT-CAM CONVEYOR ROLLERS
[75] Inventor: Gerald A. Brouwer, Grandville, Mich.
[73] Assignee: Rapistan Corp., Grand Rapids, Mich.
[21] Appl. No.: 204,897
[22] Filed: Jun. 10, 1988
[51] Int. Cl.$^4$ ............................................. B65G 15/00
[52] U.S. Cl. ...................................... 198/809; 198/725
[58] Field of Search ............... 198/809, 725, 721, 781; 193/37

[56] References Cited

U.S. PATENT DOCUMENTS

| | | | |
|---|---|---|---|
| 2,985,278 | 5/1961 | McKnight et al. | 198/809 |
| 3,000,490 | 9/1961 | Sebastian | 198/721 |
| 3,062,359 | 11/1962 | McGow et al. | 198/809 |
| 3,127,979 | 4/1964 | Sebastian et al. | 198/809 |
| 3,253,697 | 5/1966 | Good et al. | 198/781 |
| 3,420,356 | 1/1969 | Good | 198/781 |
| 3,854,576 | 12/1974 | Bowman | 198/809 |
| 4,318,468 | 3/1982 | Bodewes et al. | 198/725 X |
| 4,361,224 | 11/1982 | Bowman | 198/781 |
| 4,361,225 | 11/1982 | Saur | 198/781 |

Primary Examiner—Robert J. Spar
Assistant Examiner—James R. Bidwell
Attorney, Agent, or Firm—Price, Heneveld, Cooper, DeWitt & Litton

[57] ABSTRACT

The specification discloses a split-cam conveyor roller assembly including a pair of eccentric rollers rotatable relative one another between transportation and accumulation positions. A pin fixed in one roller is received within a circumferential slot in the other roller. A magnet is fixed at one end of the slot, and the pin is made of a ferrous material to aid in retaining the rollers in the transportation position.

7 Claims, 2 Drawing Sheets

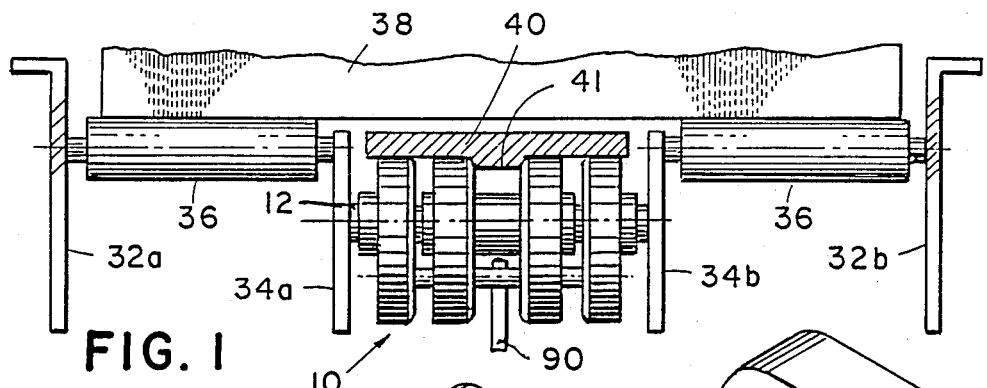
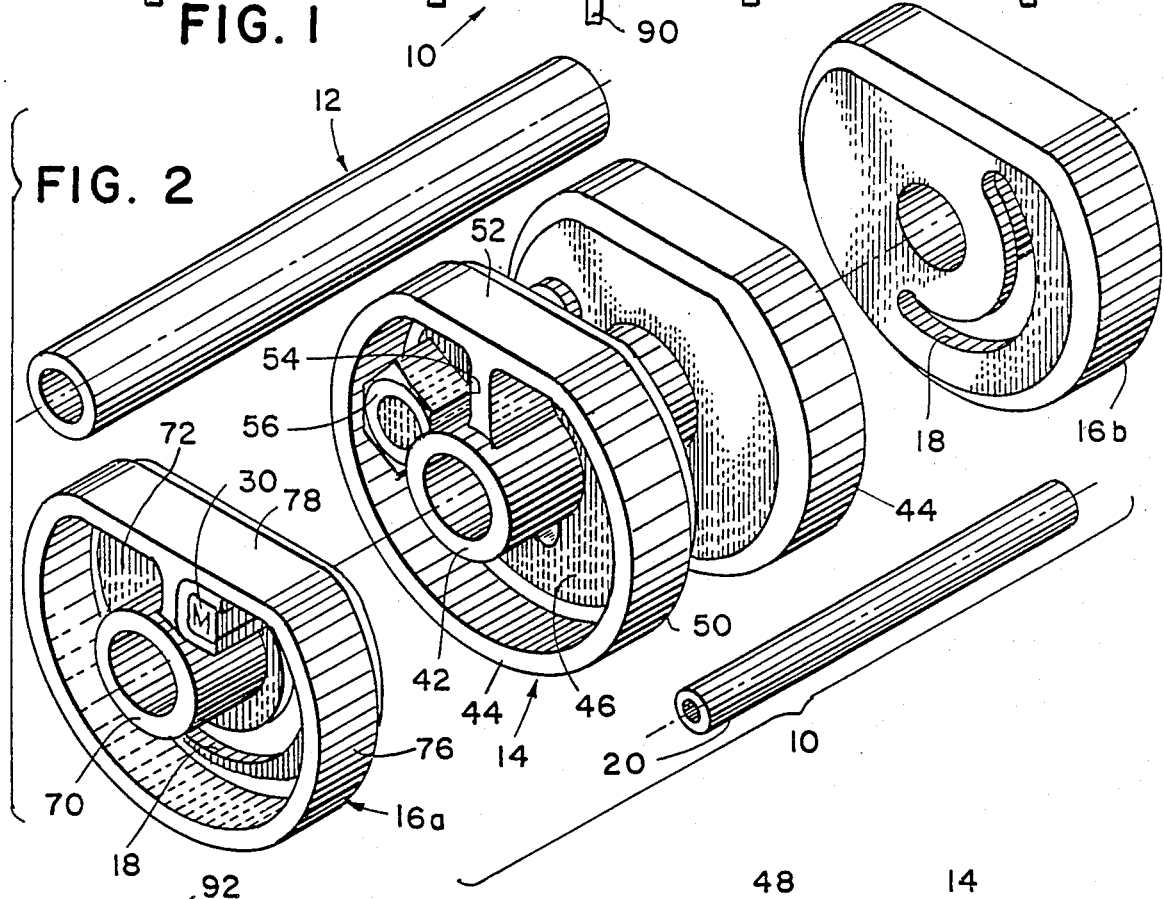

SPLIT-CAM CONVEYOR ROLLERS

BACKGROUND OF THE INVENTION

The present invention relates to accumulating conveyors, and more particularly to a split-cam conveyor roller including a pair of roller portions rotatable relative one another between raised and lowered positions.

A wide variety of powered accumulating conveyors have been developed for transporting packages along a path. One particularly efficient construction is of the wheel, roller, and belt variety wherein a propelling member such as a belt is raised and lowered between transportation and accumulation positions, respectively. An exemplary construction is illustrated in U.S. Pat. No. 3,854,576 issued Dec. 17, 1974 to Bowman, entitled ECCENTRIC WHEEL ACCUMULATORS and assigned to the assignee of the present application. Such conveyors include a plurality of split-cam rollers each including two or more eccentric roller portions. When accumulation is desired, the roller portions are stopped with their peripheral portions of least radius facing upwardly to lower the drive belt out of engagement with the transported packages. When transportation is to be restarted, the rollers are released and the circular portions of the rollers force the drive belt upwardly into engagement with the propelled articles.

The Bowman split-cam roller was developed to alleviate a noise problem existent in the prior art of that time. In then-known conveyors, each conveyor roller utilized a one-piece cam; and most cams in a conveyor section would synchronize to lift the belt in unison to the conveyed articles creating a rhythmic noise that became annoying and distracting to those working in the area.

Although the Bowman construction was developed to address this rhythmic noise problem, the assignee of the present application has found that the Bowman construction does not maintain the continuous circular drive surface desired during transportation. The desired circular configuration is usually maintained for several revolutions, and then the eccentric portions shift to approach a configuration wherein all the flats are aligned. The construction therefore produces unpredictable lifting of the belt. Although the rhythmic noise problem was solved, Bowman's rollers created an equally loud but random or arhythmic noise undersirable to workers in the area.

SUMMARY OF THE INVENTION

The aforementioned problems are overcome in the present invention wherein the separate cam portions of a split-cam conveyor are maintained in an unaligned position when the roller is in the transportation mode. The split-cam includes at least two separate eccentric portions each having a peripheral area of least radius. The split cam further includes a mechanism for urging the eccentric portions to remain in the transportation mode once they have assumed that mode to substantially reduce the arhythmic noise problem of the prior art.

As constructed in the present embodiment, one of the roller portions defines a circumferential slot; and a pin fixedly carried by the second roller portion extends through the slot. The pin abuts one or the other of two opposite slot ends when the rollers are in the accumulation and transportation positions. The pin is fabricated of a ferrous material; and a magnet is positioned at the end of the slot abutted by the pin when the rollers are in the transportation configuration. Consequently, the magnet tends to maintain the pin in this position to hold the rollers in the transportation configuration. The forces exerted on the roller portions when the pin is stopped (to enter the accumulation mode) overcome the magnetic attraction so that the portions can rotate relative one another.

The prior noise problems created by rhythmic and/or arhythmic lifting of the belt is substantially reduced, or even eliminated, by the present invention. This greatly enhances the working environment and comfort of the workers.

These and other objects, advantages, and features of the invention will be more readily understood and appreciated by reference to the detailed description of the preferred embodiment and the drawings.

BRIEF DESCRIPTION OF THE DRAWINGS

FIG. 1 is an elevational view of the split-cam conveyor roller of the present invention mounted in a conveyor system;

FIG. 2 is a perspective exploded view of the split-cam conveyor roller;

FIG. 3 is a side elevational view of the split-cam conveyor roller in the accumulation position;

FIG. 4 is a sectional view taken along Line IV—IV in FIG. 3;

DETAILED DESCRIPTION OF THE PREFERRED EMBODIMENT

Figure 5:
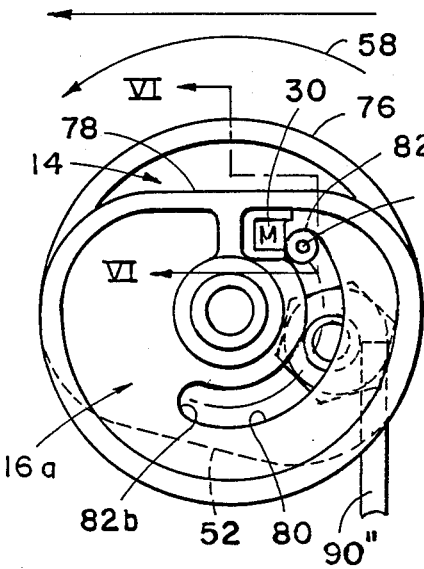
FIG. 5 is a side elevational view of the split-cam conveyor roller in the transportation position.

A split-cam conveyor roller constructed in accordance with a preferred embodiment of the invention is illustrated in FIG. 2 and generally designated 10. The roller assembly 10 includes an axle 12, an inner cam 14, and a pair of outer cams 16a and 16b. The inner cam 14 and the outer cams 16 are rotatably carried on the axle 12 and therefore have a common axis of rotation. Each of the outer cams 16 defines a circumferential or arcuate slot 18 extending approximately 180 degrees about the axle. A steel pin 20 is fixedly carried by the inner cam 14 and extends into the slot 18 on each of the outer cams 16. The outer cams 16 are rotatable relative to the inner cam 14; and the steel pin 20 limits the relative rotation. When the pin 20 engages a first end of the slots 18, the flats of the cams 14 and 16 are aligned or in phase; and when the pin engages the opposite end of the slot 18, the flats of the cams are not aligned or out of phase. A permanent magnet 30 is carried by each of the outer cams 16 adjacent one end of the slot 18. This magnet creates a magnetic field to attract the steel pin 20 and to help maintain the steel pin against the magnet once the steel pin has moved adjacent thereto. Consequently, the cams are maintained in an unaligned position by the magnetic force until a greater opposite force causes relative rotation to the accumulation position.

The environment within which the roller assembly 10 is used is generally well known to those having ordinary skill in the art and is illustrated in FIG. 1. This environment is illustrated and described in greater detail in the aforementioned U.S. Pat. No. 3,854,576, the disclosure of which is specifically incorporated herein. Generally speaking, the conveyor includes a frame having a plurality of supports 32a and 32b and 34a and 34b. Unpowered rollers 36 are mounted between the supports 32a and 34a and also between the supports 32b and 34b. The articles 38 to be conveyed ride on the rollers 36 and between the uprights 32. A powered or driven belt 40 is carried by the sequentially arranged roller assemblies 10 and can be raised and lowered between transportation and accumulation positions, respectively. As illustrated in the present FIG. 1, the belt 40 is shown in the accumulation position wherein the flats of the inner and outer cams 14 and 16 are aligned and face upwardly so that the belt is lowered and released from engagement with the conveyed articles 38. This permits the conveyed articles to accumulate above the belt without drive forces being applied thereto. When in the transportation position (not shown in FIG. 1), the flats of the inner and outer cams 14 and 16 are unaligned to provide a generally circular drive surface to the conveyor assembly 10 and thereby raise the drive belt 40 into engagement with the conveyed articles.

Turning specifically to the elements of the split-cam conveyor assembly 10, the axle 12 is fabricated of steel or other suitable material and is generally circular in cross section throughout its length. The axle 12 is mounted between the supports 34a and 34b (FIG. 1) in conventional fashion to support the roller assembly 10 in the conveyor system.

The inner cam 14 is best illustrated in FIGS. 2 and 4. The inner cam 14 includes a hub portion 42 and a pair of cam portions 44a and 44b extending therefrom. The hub 42 is generally uniform and circular in cross section throughout its length. The internal diameter of the hub 42 is dimensioned to closely and rotatably receive the axle 12.

The two roller portions 44 are spaced from one another to receive the belt spline 41 therebetween and thereby retain the belt in lateral position. The roller portion 44 extends radially outwardly from the hub 42 and includes a web portion 46 and a peripheral wall portion 48 oriented generally perpendicularly thereto. When viewed in profile, the peripheral wall 48 is eccentric and includes a circular portion 50 (see FIG. 2) and a flattened portion 52 of least radius. The circular portion 50 extends approximately 270 degrees about the perimeter of the roller, while the flattened portion 52 extends approximately 90 degrees about the perimeter. A reinforcing rib 54 extends between the hub 42 and the flattened portion 52 to provide additional strength. The second roller portion 44b of the inner cam 14 is a generally identical mirror image of the first roller portion 44a and therefore will not be described in detail.

Preferably, the inner cam 14 and each outer cam 16 is a single piece; and most preferably each piece is injection molded of acetal copolymer with 0.6% PTFE fill.

A steel pin 20 is fixedly secured within the inner cam 14. More specifically, the pin 20 is supported within the webs 46 of the roller portions 44 and is oriented generally perpendicularly thereto. The pin 20 extends from either end of the inner cam 14 a sufficient distance to cooperate with the outer cams 16 as will be described. The pin 20 may be fabricated of other ferrous materials having the requisite strength for the described application.

A counter weight 56 is supported by the web 46 just forwardly of the flattened portion 52 with respect to the direction of travel 58 (see FIG. 3). Although the specifically disclosed counterweight 56 is a hexnut, virtually any other suitable item or material could be used which is relatively heavy with respect to the material of which the inner cam 14 is fabricated.

The outer cams 16 are also eccentric in profile. The two outer cams 16 are mirror images of one another, and accordingly only outer cam 16a will be described in detail. Generally speaking, the outer cam 16a includes a hub portion 70, a web portion 72, and a peripheral wall 74. The peripheral wall 74 includes a circular portion 76 and a flat portion 78 of least radius (see FIG. 2). The circular portion 76 extends through approximately 240 degrees of the roller periphery, while the flat portion 78 extends through approximately 120 degrees of the roller periphery. As seen in FIGS. 3 and 4, the flattened portions 78 of the outer roller 16 are of a reduced radius with respect to the flattened portions 52 of the inner cam 14. Consequently, the drive belt 40 engages only the flattened surfaces 52 of the inner cam 14 when the cams are in the accumulation position illustrated in FIGS. 1 and 3–4.

The web portion 72 defines a peripheral or arcuate slot 80 centered about the hub 70. The slot extends less than 360 degrees, and preferably approximately 180 degrees, about the hub and includes first and second opposite ends 82a and 82b. The permanent magnet 30 is supported by the web 72 adjacent the first end 82a. If the cam 16 is injection-molded, the material can be molded about the magnet.

The steel pin 20 extends through each slot 80 in each of the outer cams 16. The pin-and-slot arrangement limits the relative rotational movement between the inner cam 14 and the outer cams 16. The pin 20 abuts the first end 82a and the magnet 30 when the cams are in the transportation configuration with the flats unaligned; and the pin 20 abuts the second end 82b when the cams are in the accumulation configuration with the flats aligned.

A stop pin 90 is actuated by an appropriate mechanism not specifically shown but illustrated in detail in the aforementioned U.S. Pat. No. 3,854,576. Its operation will not be redescribed in detail herein. Suffice it to say that the stop pin 90 is moveable between an accumulation position 90' illustrated in FIGS. 3 and 7 and a transportation position 90" illustrated in FIG. 5.

Operation

The basic operation of a split-cam conveyor roller is illustrated and described in detail in the aforementioned U.S. Pat. No. 3,854,576. Consequently, the operation will not be redescribed herein in detail. However, the function and operation of the split-cam roller is significantly improved over the prior art due to the magnet 30 as described below.

FIGS. 3–8 set forth the three basic relative orientations of the inner and outer cams 14 and 16 within the assembly 10. Turning first to FIGS. 3 and 4, the accumulation configuration is illustrated. The direction of belt travel 92 (FIG. 3) urges the cams 14 and 16 to follow the direction of rotation 58. Consequently, movement of the stop pin 90 to the position 90' will cause the steel pin 20 to catch thereagainst and stop. Since the steel pin 20 is fixedly secured to the inner cam 14, this also stops movement of the inner cam. The outer cams 18 are also stopped when the second end 82b of the slot 80 abuts the steel pin 20. At this point, the flats 52 of the inner cam 14 and the flats 78 of the outer cams 16 are generally aligned and facing upwardly to lower the drive belt 40. As previously mentioned, the flats 52 are slightly higher than the flats 78 in the accumulation configuration. With the drive belt 40 so lowered, it is free to travel below the conveyed articles 38 (see FIG. 1) without applying a motive force thereto.

Figure 6:
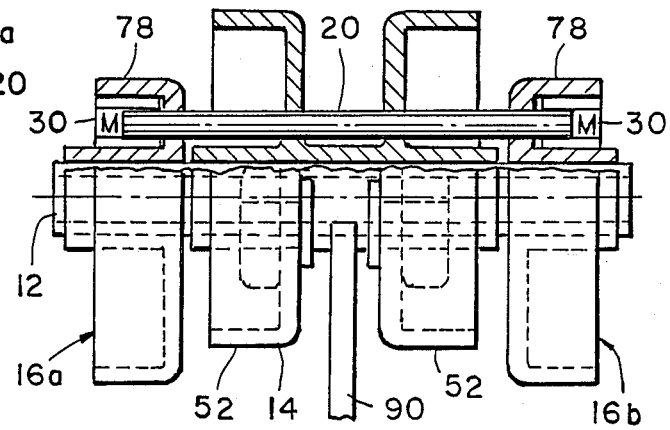
FIG. 6 is a front elevational view, partially in section along Plane VI—VI in FIG. 5.

When the accumulation mode is to be terminated, the stop pin 90 is moved to the transportation position 90" illustrated in FIGS. 5 and 6. The steel pin 20 is thereby released, and the inner cam 14 is again free to rotate. Because the inner cam flat 52 is higher than the outer cam flat 78, the drive belt 40 will first impart a rotational force to the inner cam 14 which begins to rotate in the direction of travel 58. The counterweight 56 further contributes to this initial rotation. As the inner cam 14 rotates, the drive belt 40 is lifted into contact with the conveyed articles 38 by the circular portion 76 of the inner cam. Since the drive belt 40 engages only the inner cam 14 during this initial movement, the outer cams 16 remain basically stationary; and the pin 20 moves within the slot 80 to the first slot end 82a adjacent the magnet 30. This position is illustrated in FIG. 5. Once the steel pin 20 engages the slot end 82a, the outer cams 16 are also rotated. As illustrated in FIG. 6, the flats 52 and 78 are unaligned in this transportation position so that the inner and outer cams 14 and 16 together provide a circular configuration to maintain the drive belt 40 in contact with the conveyed articles.

The magnet 30 exerts an attractive force or influence on the steel pin 20. Consequently, the steel pin 20 remains against the magnet 30 and against the first slot end 82a until a force greater than the magnetic attraction is applied in the opposite direction. This prevents the inner and outer cams 14 and 16 from rotating relative one another when in the transportation mode leading to the aforementioned arhythmic noise which has been a problem in the prior art.

Figure 7:
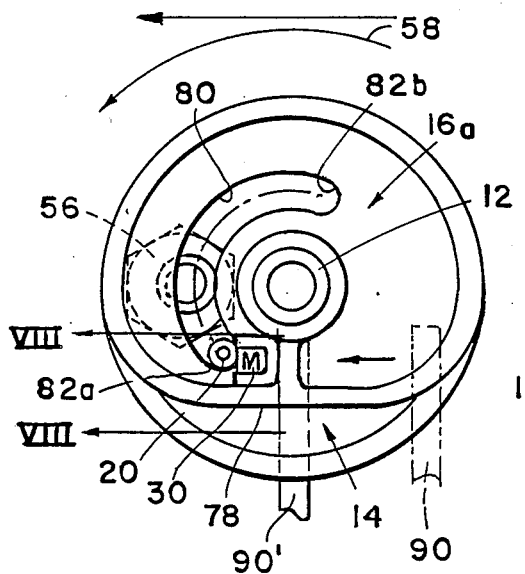
FIG. 7 is a side elevational view of the conveyor roller about to enter the accumulation position.
Figure 8:
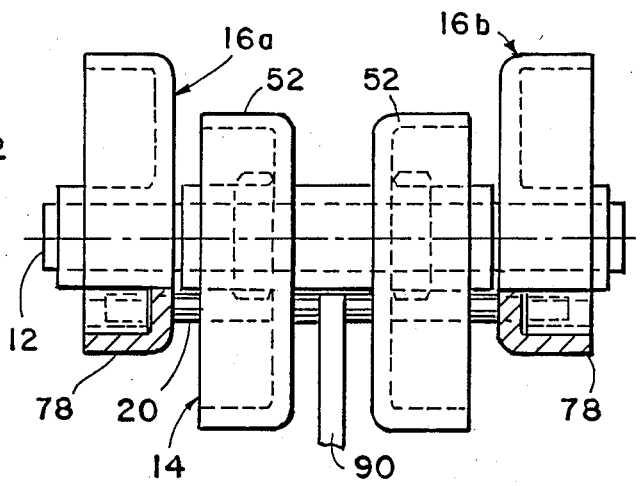
FIG. 8 is a front elevational view of the conveyor roller positioned as illustrated in FIG. 7.

The steel pin 20 and the magnet 30 are separated when the stop pin 90 is again shifted to the accumulate position 90'. The initial step in this sequence is illustrated in FIGS. 7 and 8 wherein the stop pin 90 has been returned to the accumulation position 90'. As the cams 14 and 16 rotate, the steel pin 20 will be brought around into engagement with the stop pin 90. When the two pins meet, the inner cam 14 abruptly stops rotating. The flats 52 of the inner cam 14 now face upwardly; and the frictional force exerted by the drive belt 40 is borne solely by the outer cams 16 which continue to rotate in the direction of travel 58. Consequently, the outer cams 16 continue to rotate relative to the stopped inner cam 14 and the second slot end 82b rotates into engagement with the stopped steel pin 20. At this point, the split-cam conveyor roller assembly has reassumed the accumulation position illustrated in FIGS. 3 and 4.

The roller assembly of the present invention therefore provides a quieter conveyor since the split cams are maintained in the transportation position by the magnetic force between the steel pin 20 and the magnet 30. Consequently, the inner and outer cams 14 and 16 do not randomly assume the accumulation configuration to create the arhythmic noise experienced in the prior art.

The above description is that of a preferred embodiment of the invention. Various alterations and changes can be made without departing from the spirit and broader aspects of the invention as set forth in the appended claims, which are to be interpreted in accordance with the principles of patent law including the doctrine of equivalents.

The embodiments of the invention in which an exclusive property or privilege is claimed are defined as follows:

1. A cam roller assembly for supporting a propelling member in both raised and lowered positions, said cam roller comprising:
   first and second eccentric rollers mounted coaxially and rotatable relative to one another between a lowered position wherein the portions of least radius of said rollers are in phase with each other and a raised position wherein the portions of least radius of said rollers are out of phase with each other;
   stop means for limiting relative movement of said first and second rollers between the lowered and raised positions; and
   retaining means for releasably retaining said first and second rollers in the raised position after said rollers are moved to said raised position said retaining means being a magnetic member on one of said first and second rollers and magnetically attracted means on the other of said first and second rollers.

2. A conveyor roller comprising:
   a pair of roller portions mounted on a common axis and relatively rotatable;
   limit means for limiting the relative rotation of said roller portions between two extreme positions; and
   retention means including magnetic means for creating a magnetic force for urging said roller portions to remain in one of said positions.

3. A conveyor roller as defined in claim 2 wherein said limit means includes:
   one of said roller portions defining an arcuate slot having first and second ends; and
   a ferrous pin member extending from the other roller portion into said slot and engaging said slot ends when said roller portions are in said extreme positions; and
   further wherein said magnetic retention means includes a magnet positioned adjacent one of said slot ends.

4. An improved cam roller assembly for a conveyor assembly, said cam roller assembly including:
   first and second rollers rotatable about a common axis and rotatable relative one another between a first position and a second position;
   stop means for limiting relative movement of said rollers between the first and second positions, said stop means including said first roller defining a circumferential groove of less than 360 degrees having first and second ends and a pin member carried by said second roller and extending through said groove to be engageable with said first and second ends when said rollers are in the first and second positions, respectively; and
   a magnet carried by said first roller adjacent said first slot end, said pin member being ferrous whereby said magnet exerts an attractive force on said pin member such that, after pin engages said first slot end, said pin is subsequently retained against said first slot end until the magnetic force between said magnet and said pin is overcome.

5. A cam roller assembly for alternately supporting a propelling member in either a raised or lowered position, said cam roller comprising:
   first and second eccentric rollers each having a portion of reduced radius mounted coaxially and rotatable relative to each other between a release position wherein the portions of reduced radius are in phase with each other and a drive position wherein the portions of reduced radius are out of phase with each other;

stop means for selectively preventing rotation of said first roller;

a lost motion means mounted on said first rollers for alternately interconnecting said first and second rollers in the release or drive position, said lost motion means being a pin of magnetic material and said retaining means being a magnet; and said magnet releasably holding said first and second rollers in the drive position after said lost motion means has shifted to the drive position.

6. A cam roller assembly for supporting a propelling member in both raised and lowered positions, said cam roller comprising:

first and second eccentric rollers mounted coaxially and rotatable relative one another between a lowered position wherein the portions of least radius of said rollers are in phase with each other and a raised position wherein the portions of least radius of said rollers are out of phase with each other;

stop means for limiting relative movement of said first and second rollers between the lowered and raised positions; and retaining means for releasably retaining said first and second rollers in the raised position after said rollers are moved to said raised position, said retaining means being magnetic for providing a magnetic attraction between a portion of said first roller and a portion of said second roller.

7. A cam roller assembly for supporting a propelling member in both raised and lowered positions, said cam roller comprising:

first and second eccentric rollers coaxially mounted and rotatable relative to one another between a lowered position wherein the portions of least radius of said rollers are in phase with each other and a raised position wherein the portions of least radius of said rollers are out of phase with each other;

said first roller defining an arcuate slot having first and second ends;

a pin member of ferrous material extending from said second roller into said slot, said pin member engaging said first and second slot ends when said rollers are in the raised and lowered positions, respectively;

stop means for limiting relative movement of said first and second rollers between the lowered and raised positions; and magnetic retaining means positioned at said first end for releasably retaining said pin member when said first and second rollers are moved to their respective raised positions.

* * * * *